UNITED STATES PATENT OFFICE.

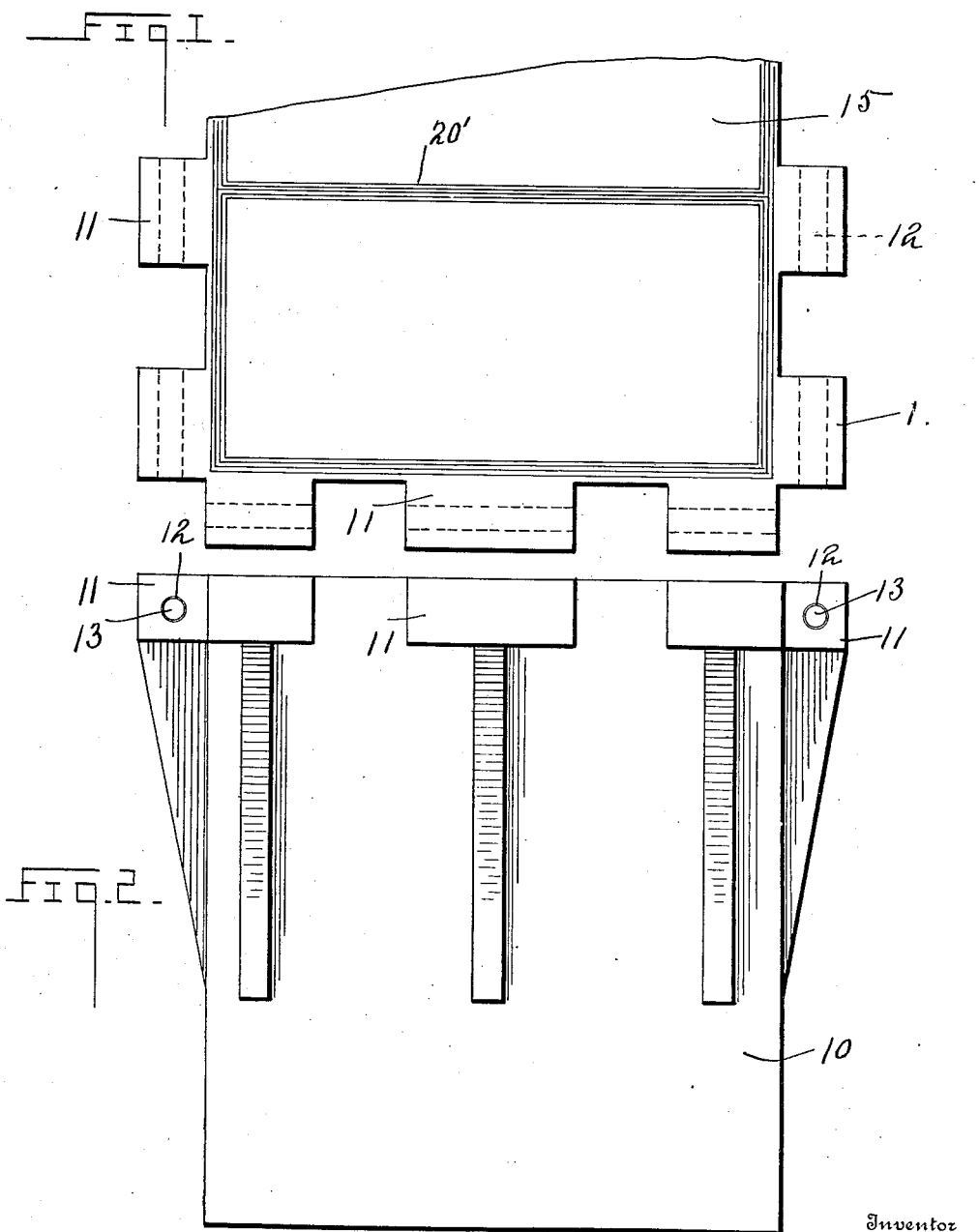

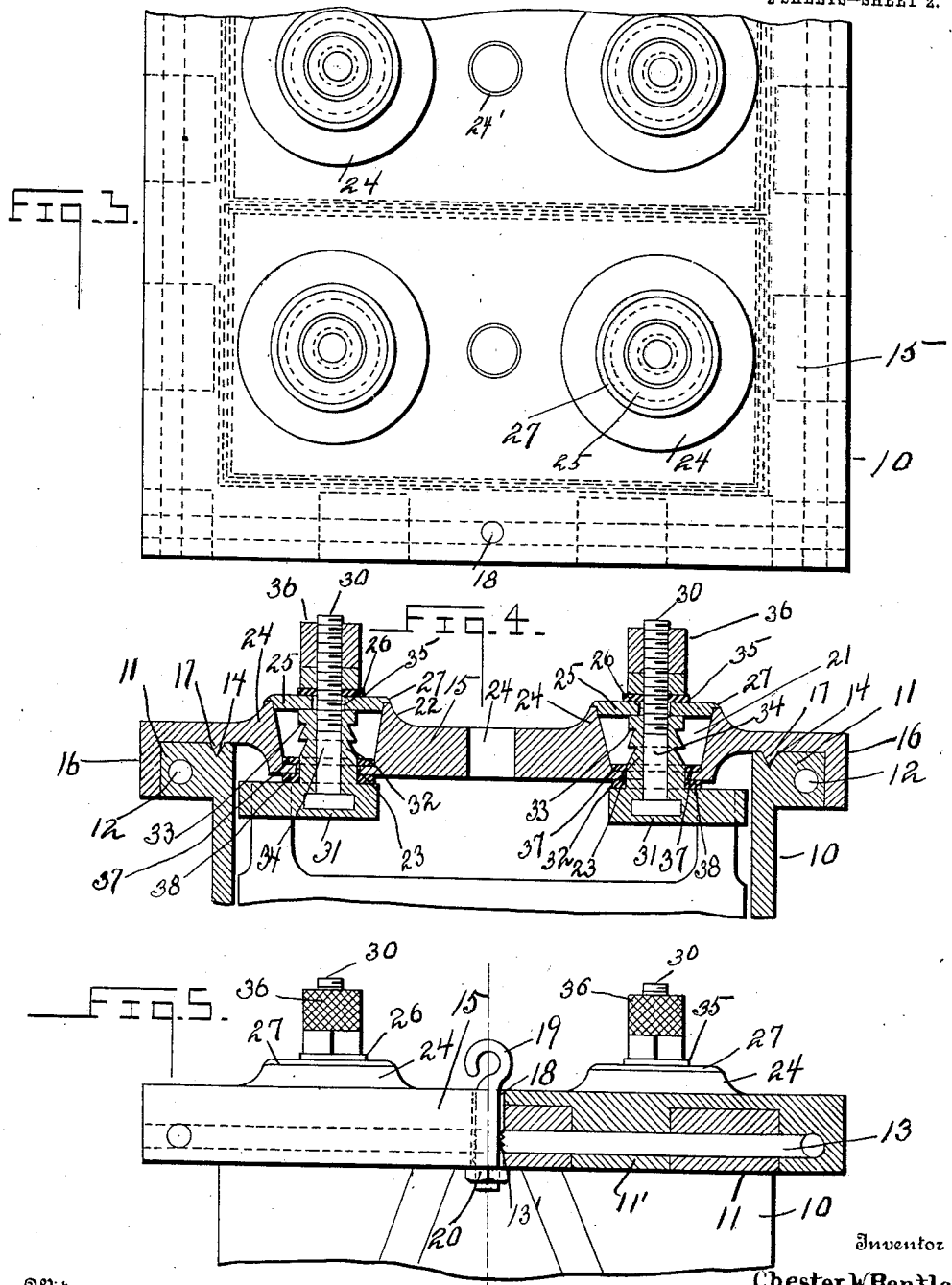

CHESTER W. BENTLEY, OF BINGHAMTON, NEW YORK.

STORAGE-BATTERY JAR.

No. 915,328.  Specification of Letters Patent.  Patented March 16, 1909.

Application filed June 19, 1908. Serial No. 439,348.

*To all whom it may concern:*

Be it known that I, CHESTER W. BENTLEY, a citizen of the United States, residing at Binghamton, in the county of Broome and State of New York, have invented certain new and useful Improvements in Storage-Battery Jars, of which the following is a specification.

This invention relates to electrical apparatus, and more particularly to storage batteries, and has for its object to provide a battery jar of an especially desirable type, in which the liability of local short circuiting is largely obviated.

Another object is to provide a battery jar having a cover, engaged thereover in such a way as to hermetrically seal the jar.

Another object is to provide a cover for battery jars especially adapted to receive electrodes therein so that they will be perfectly insulated against short circuit.

Another object is to provide a jar and cover having special interlocking construction adapted to simple manipulation.

Other objects and advantages will be apparent from the following description, and it will be understood that changes in the specific structure shown and described may be made within the scope of the claims and that any suitable materials may be used without departing from the spirit of the invention.

In the drawings forming a portion of this specification, which represent but one end portion of the device and in which like numerals of reference indicate similar parts in the several views, Figure 1 is a top plan view of the receptacle, Fig. 2 is a side view of the receptacle, Fig. 3 is a top view of the receptacle having the cover thereon, Fig. 4 is a cross sectional view of the cover, engaged upon the receptacle, and having plates and electrodes engaged therewith, Fig. 5 is an end view of the upper portion of the receptacle with the top engaged thereon, partly shown in cross section.

Referring to the drawings, there is shown a receptacle 10 of any suitable shape, having spaced outwardly projecting lugs 11 adjacent to its top through which there are formed registering openings 12 adapted to receive a rod 13 slidably therethrough. A groove 14 is formed in the upper face of the walls of the receptacle in spaced relation with the inner edge of the wall, as shown. There is shown also a cover 15 for the receptacle 10, comprising a flanged member adapted to fit closely over the receptacle 10 having a downwardly extending flange portion 16 adapted to engage closely outwardly of the lugs 11 and having a rib 17 spaced inwardly from its edge on the under side, and adapted for registering engagement with the groove 14 in the upper face of the receptacle 10. An opening 18 is formed in the cover 15 through the central lug at the end of the receptacle, to receive bolts 19 downwardly therethrough, upon the lower end of which is secured a nut 20 the bolt having an eye therethrough at its upper end adapted for use to lift the battery.

This invention is adapted to accommodate any desirable number of cells and, as illustrated, two cells are shown divided by a partition 20' extending laterally across and formed integrally with the receptacle 10. Spaced laterally of the cover 15 there are recesses 21 each having a raised portion 2 therearound, as shown. Concentrically of the recesses 21 there are openings 23 for a purpose to be subsequently indicated. Two of the recesses 21 are formed over each cell, as shown. An opening 24' is formed through the cover 15 over each cell to receive a plug therein, adapted to be removed to allow the escape of gases when a battery is formed therein. A cap 25 having a concentric opening 26 therethrough, is engaged over each recess 21 and has a flange 27 extending therearound and adapted to engage over the face of the raised portion 22 adjacent to the recess 21. Disposed concentrically within each recess 21 there is a terminal member 30 comprising yoke members 31 adapted for engagement with storage battery plates in the usual manner, and having cylindrical upwardly extending portions 32 provided with spaced peripheral grooves 33, the upwardly extending portions being engaged slidably through the openings 23 in the recesses 21, and stopping short of the raised portion 22, as shown. A binding post 34 is carried by the portions 31 and 32 and extends upwardly through the opening 26 and receives thereover a washer 35 and binding nut 36, as shown. Disposed around the portion 32 below the cover 15 there is an insulating washer 37 and in the base of the recess 21 around the portion 32 there is a similar washer 38, as shown.

In use, the yokes 31 are engaged with their respective plates, and adjusted within the cell, the proper solution being introduced in the cells, and the cover 15 placed downwardly over the receptacle, the portion 32 being engaged through the opening 23, as shown. Suitable non-conducting viscid material or liquid is engaged in the groove 14 before putting the lid on, so that a water tight closure is formed around the edge of the receptacle 10 when the cover is introduced thereover. Similar viscid material or liquid is introduced in the recesses 21 after the cover is in position upon the receptacle 10, and the top 25 then engaged downwardly around the posts 34 and followed by the washer and nuts 35 and 36, as shown. It will be understood that when it is desired to engage wire with the terminal 30 the upper of the nuts 36 is loosened and the wire introduced thereunder upon which the nut 36 may be again tightened, and the wire held firmly.

The cover 15 is provided with spaced lugs 11' around its outer edge and is adapted to engage between the lugs 11 formed upon the receptacle 10, the lugs 11' having registering openings 13' therethrough adapted to receive the rods 13 therethrough in coengagement with the opening 12.

What is claimed is:

1. A storage battery jar adapted to be made of plastic material and comprising a receptacle portion having spaced outwardly extending lugs around its upper edge, said receptacle having a groove formed in its upper edge face, a cover having an integral flange therearound, and integral lugs formed inwardly of the flange and adapted to intermesh with the first named lugs, said first and second named lugs having registering openings therethrough, said top having a rib formed thereon and adapted to registering engagement in the groove, said groove being adapted to receive a sealing material therein for engagement with the rib to hermetically seal the jar, and rods slidably engaged through the openings in the first and second named lugs to retain the cover in close engagement with the receptacle against displacement of said rib from sealing engagement in said groove.

2. A jar of the class described comprising a receptacle, a cover for said receptacle formed of plastic material and adapted for detachable locking engagement thereon, said cover having a plurality of spaced recesses therein, and having a raised portion concentrically of each recess, said top having openings formed therethrough concentrically of the recesses, terminal members slidably engaged in said openings, and having enlarged portions at their lower ends, insulating washers engaged around said terminal members below the cover, insulating washers engaged around the terminal members within the recesses, said recesses being adapted to receive liquid or fluid insulating material therein, a concentrically perforated cap engaged closely over said recesses, means for securing said terminal member to the cover, and means for engaging electrical conductors with the terminal members.

3. As an article of manufacture, a jar for storage batteries comprising a receptacle portion having spaced outwardly extending integral lugs around its upper edge, said lugs having registering perforations therethrough a cover formed of plastic material and having a pendent flange therearound, said cover having also integral spaced lugs outwardly of the flange and having registering openings therethrough, said second named lugs being adapted for intermeshed engagement with said first named lugs, a rod slidably engaged in the openings of said first and second named lugs, said cover having a plurality of spaced recesses formed therein, and having a concentric raised portion around each of said recesses, said top having perforations therethrough concentrically of the openings in the recesses adapted to receive terminal members in close insulating engagement therethrough, said recesses being adapted to receive plastic insulating material therein to engage closely around said terminal members, said receptacle having a groove formed in its upper edge face, said top having a rib formed thereon adapted for registering engagement with said groove, for engagement against sealing material disposed within the groove.

4. A storage battery container comprising a receptacle portion having spaced lugs therearound, said lugs having registering openings therethrough, said receptacle having also a groove in its upper edge and extending entirely therearound, a cover for said receptacle having a peripheral flange adapted to close engagement over said receptacle, and having spaced lugs on its lower face adapted for interlocking engagement with said first named lugs, said second named lugs being perforated to register with said openings through said first named lugs, a rod slidably engaged in said registering openings, said cover having a rib on its under face adapted to register engagement with said groove, said cover having spaced recesses therein, and raised portions concentrically of said recesses, said cover having perforations concentrically of said recesses, terminal electrodes engaged slidably in said openings and adapted for engagement with battery plates carried by said receptacle, said terminal electrodes having peripherally grooved portions disposed within said recesses, said recesses being adapted to receive plastic insulating material therein around said terminal electrodes, an insulating washer disposed between the under face of said cover and adjacent portion of said terminal electrodes, a perforated top disposed over said terminal electrodes adapted to close said recess after the engagement of the insulating material therein, means for securing said cap over said recess, and means for securing terminal wires to said terminal electrodes.

5. In an article of the class described, the combination with a receptacle, of a cover having spaced recesses therein, said cover having a raised portion concentrically of each recess, and having perforations formed concentrically of the recesses, terminal members engaged slidably through the openings, said recesses being adapted to receive plastic insulating material therein around said terminal members, a concentrically perforated cap adapted to engage over said terminal members to close said recesses, means for securing said terminal members to the cover, and means for securing terminal wires to the terminal members.

In testimony whereof I affix my signature, in presence of two witnesses.

CHESTER W. BENTLEY.

Witnesses:
   GENEVIEVE E. COTTON,
   LEON ARMANT.